(12) United States Patent
Sugiyama (10) Patent No.: US 8,135,242 B2
(45) Date of Patent: Mar. 13, 2012

(54) OPTICAL MODULATOR

(75) Inventor: Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 320 days.

(21) Appl. No.: 12/636,522

(22) Filed: Dec. 11, 2009

(65) Prior Publication Data
US 2010/0202723 A1    Aug. 12, 2010

(30) Foreign Application Priority Data

Feb. 10, 2009   (JP) .................................. 2009-029004

(51) Int. Cl.
   G02F 1/035   (2006.01)
   G02B 6/12   (2006.01)
(52) U.S. Cl. .................................. 385/2; 385/3; 385/14
(58) Field of Classification Search .......................... None
   See application file for complete search history.

(56) References Cited

U.S. PATENT DOCUMENTS

| | | | | |
|---|---|---|---|---|
| 5,148,503 A | * | 9/1992 | Skeie | 385/3 |
| 6,192,167 B1 | * | 2/2001 | Kissa et al. | 385/3 |
| 6,483,953 B1 | * | 11/2002 | McBrien et al. | 385/2 |
| 6,571,026 B2 | * | 5/2003 | Kondo et al. | 385/2 |
| 7,027,668 B2 | * | 4/2006 | Tavlykaev et al. | 385/2 |
| 7,245,788 B2 | * | 7/2007 | Fujita et al. | 385/3 |
| 2003/0002766 A1 | * | 1/2003 | Pruneri et al. | 385/2 |
| 2003/0228081 A1 | * | 12/2003 | Tavlykaev et al. | 385/3 |
| 2005/0213863 A1 | * | 9/2005 | Sugiyama et al. | 385/2 |
| 2008/0025662 A1 | * | 1/2008 | Kondo et al. | 385/8 |
| 2008/0112710 A1 | | 5/2008 | Tanaka | |

FOREIGN PATENT DOCUMENTS

JP   2008-122786   5/2008

* cited by examiner

*Primary Examiner* — Michelle R Connelly Cushwa
(74) *Attorney, Agent, or Firm* — Fujitsu Patent Center (57) ABSTRACT

In an optical modulator, an intermediate substrate is provided separate from a main substrate on which a plurality of optical modulation sections are provided in parallel, and signal lines corresponding to the optical modulation sections are formed on the intermediate substrate. The signal lines are connected to signal electrodes corresponding to the main substrate, and have electrical lengths that are different from each other. Furthermore, the propagation loss per unit length in the signal lines on the intermediate substrate is preferably less than the propagation loss per unit length in the signal electrodes on the main substrate. As a result, even if a plurality of optical modulation sections are arranged in parallel, and the input ends of the signal electrodes of the optical modulation sections are arranged side by side on one side face of the substrate, synchronized modulation light of a low noise at a wide band width can be output from the optical modulation sections.

14 Claims, 6 Drawing Sheets

FIG.1

RELATED ART

FIG.2

RELATED ART

OPTICAL MODULATOR

CROSS-REFERENCE TO RELATED APPLICATION

This application is based upon and claims the benefit of priority of the prior Japanese Patent Application No. 2009-029004, filed on Feb. 10, 2009, the entire contents of which are incorporated herein by reference.

FIELD

The embodiment relates to an optical modulator which is an optical wave guide device used in optical communication, and is configured with a plurality of Mach-Zehnder (MZ) type modulation sections arranged in parallel on a single substrate.

BACKGROUND

An optical waveguide device that uses an electro-optic crystal such as lithium niobate ($LiNbO_3$) or lithium tantalate ($LiTaO_2$), is formed by forming a metal film of titanium (Ti) or the like on a part of a crystal substrate, to be thermally defused, or to be patterned, after which it is proton exchanged or the like in benzoic acid, to form an optical waveguide, and thereafter an electrode is provided in the vicinity of the optical waveguide. As such an optical waveguide device that uses an electro-optic crystal, there is known for example an optical modulator as illustrated in FIG. 1.

Figure 1:
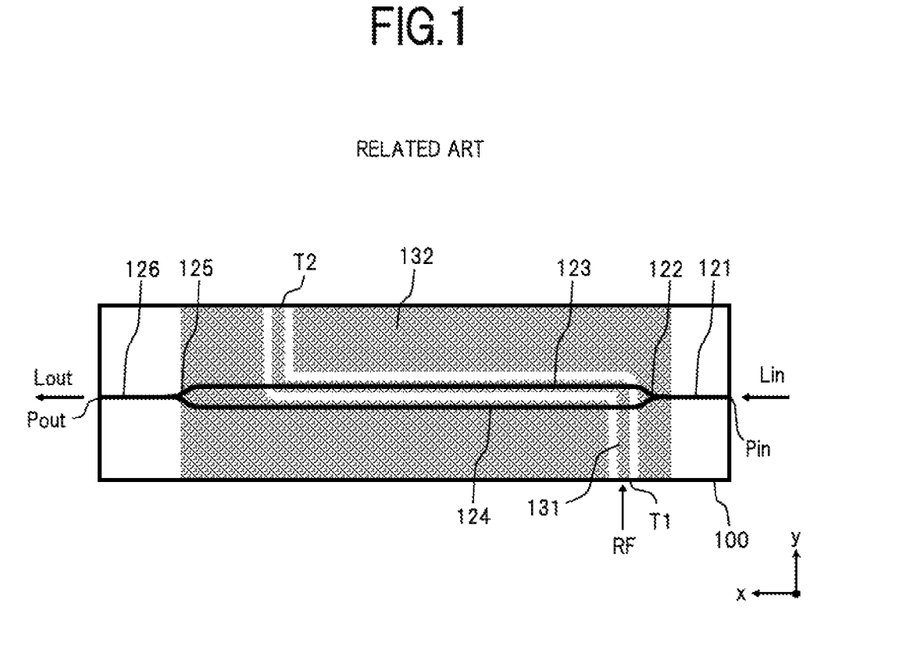
FIG. 1 is a plan view illustrating a configuration example of a general Mach-Zehnder type optical modulator.

In FIG. 1, an optical waveguide formed on a substrate 100 comprises; an input waveguide 121, an optical branching section 122, a pair of branching waveguides 123 and 124, an optical multiplexing section 125, and an output waveguide 126. A signal electrode 131 and an earth electrode 132 are provided on the pair of branching waveguides 123 and 124, to form a co-planar electrode. In the case where a Z-cut substrate is used, in order to use the refractive index variation due to the electric field in the Z direction, the signal electrode 131 and the earth electrode 132 are arranged directly above the optical waveguides. More specifically, the electrodes are patterned with the signal electrode 131 on the branching waveguide 123, and the earth electrode 132 on the branching waveguide 124. Here in order to prevent the light that is propagated through the branching waveguides 123 and 124 from being absorbed by the signal electrode 131 and the earth electrode 132, a buffer layer (not illustrated in the figure) is provided between the substrate 100, and the signal electrode 131 and the earth electrode 132. For the buffer layer, an oxide silicon ($SiO_2$) or the like of 0.2 to 2 µm thickness is used.

In the case where such an optical modulator is driven at high speed, the output end T2 of the signal electrode 131 is connected to the earth electrode 132 via a resistance (not illustrated in the figure) to make a travelling wave electrode, and a microwave electric signal RF is applied from the input end T1 of the signal electrode 131. At this time, due to the electric field generated between the signal electrode 131 and the earth electrode 132, the refractive indices of the branching waveguides 123 and 124 respectively change as +na and −nb, so that the phase difference of the light propagated on the branching waveguides 123 and 124 changes. Therefore, a light Lin input to the input port Pin is intensity modulated by Mach-Zehnder (MZ) interferometer, and modulation light Lout is output from an output port Pout. By changing the cross-section shape of the signal electrode 131 to control the effective refractive index of the microwave electric signal RF, and by matching propagation speeds of the light and the microwave electric signal with each other, high speed optical response characteristics can be obtained.

Furthermore, due to the variety of recent optical modulation formats (for example multi-valued modulation formats, optical polarization division multiplexing formats, and the like), there are many cases where signals corresponding to a desired optical modulation format are generated, by combining a number of conventional optical modulators such as illustrated in FIG. 1 (for example, refer to Japanese Laid-open Patent Publication No. 2008-122786).

In the above described configuration where a plurality of optical modulators are combined, in order to reduce the size of the overall optical modulator, it is effective to integrate respective optical modulators on a single chip (substrate). In the following description, individual optical modulators integrated on a single chip is referred to as "an optical modulation section".

Figure 2:
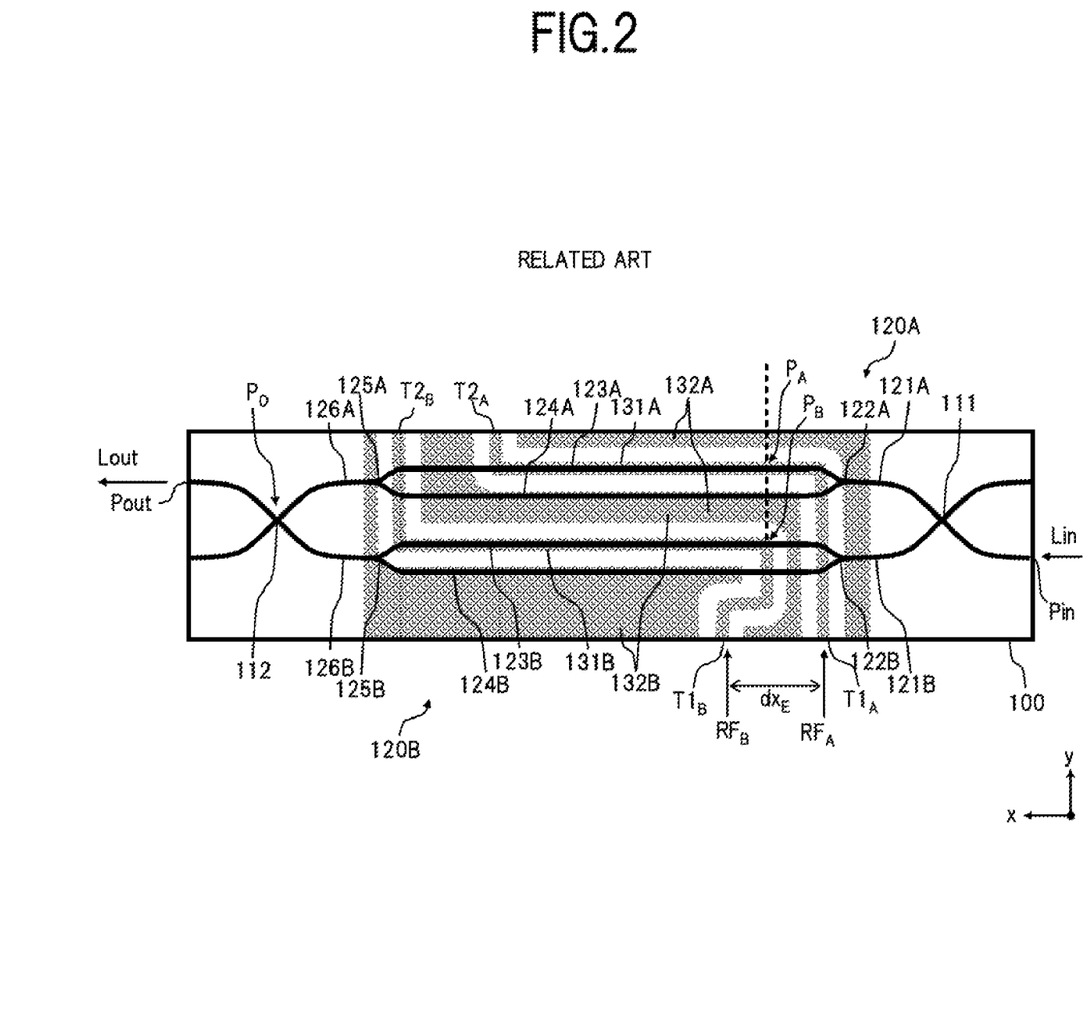
FIG. 2 is a plan view illustrating a configuration example of a case where two optical modulation sections are arranged in parallel on a single substrate.

More specifically, the optical modulator illustrated in FIG. 2 is a configuration example of where two optical modulation sections 120A and 120B are arranged in parallel on a single substrate 100. The optical modulation sections 120A and 120B, similarly to the configuration illustrated in FIG. 1, each have an MZ type optical wave guide, a signal electrode, and an earth electrode. Furthermore, one light input end of an input optical branching section 111 that uses a 2×2 optical coupler is connected to an input port Pin positioned on one end face of the substrate 100, and the two light output ends of the input optical branching section 111 are each connected to input wave guides 121A and 121B of the respective optical modulation sections 120A and 120B. As a result, input light Lin from the input port Pin is bifurcated and guided to the respective optical modulation sections 120A and 120B. Moreover, the two light input ends of an output optical branching section 112 that uses a 2×2 optical coupler are each connected to output wave guides 126A and 126B of the respective optical modulation sections 120A and 120B, and one light output end of the output optical branching section 112 is connected to an output port Pout located on the other end face of the substrate 100. As a result, the modulation light output from the respective optical modulation sections 120A and 120B is multiplexed into one, and output to the outside from the output port Pout.

In the above described configuration, in the case of applying electric signals $RF_A$ and $RF_B$ from the outside to signal electrodes 131A and 131B of the respective optical modulation sections 120A and 120B, electrode input terminals are provided in a package (not illustrated in the figure) for accommodating the substrate 100. If electrode input terminals respectively corresponding to the optical modulation sections 120A and 120B are placed side by side on the side face on one side of the package, mounting of the substrate 100 can be facilitated, and the mounting footprint made small. In this case, for the respective signal electrodes 131A and 131B on the substrate 100, electrode pads formed near each of input ends $T1_A$ and $T1_B$ are arranged side by side on one side (the lower side in the figure) of the opposite side faces of the substrate 100. In the electrode pads, in order to connect to the outside (the electrode input terminals of the package) with wire bonding or the like, it is necessary to have a certain amount of spacing.

In the case where, as described above, the input ends $T1_A$ and $T1_B$ of the respective signal electrodes 131A and 131B are arranged with a predetermined spacing on one surface of the substrate 100, if desired to match the timing at which the light and electric signal interact in the respective optical modulation sections 120A and 120B, then as illustrated in the example of FIG. 2, it is necessary to bend the input leader line portion from the input end $T1_B$ of one signal electrode 131B up to on the branching waveguide 123B, to delay the electric signal $RF_B$. More specifically, when the electric signals $RF_A$ and $RF_B$ are applied simultaneously to the input ends $T1_A$ and $T1_B$ of the respective signal electrodes 131A and 131B, then in order to synchronize these with the modulation lights output from the respective optical modulation sections 120A and 120B, if the point where the respective modulation lights are multiplexed in the output optical branching section 112 is $P_O$, and the points on the respective branching waveguides 123A and 123B where the optical path lengths from the point $P_O$ become equal are $P_A$ and $P_B$, it is necessary to make the electrical length of the portion from the input end $T1_B$ of the signal electrode 131B up to the point $P_B$ equal to the electrical length of the portion from the input end $T1_A$ of the signal electrode 131A up to the point $P_A$.

However, in the configuration of FIG. 2, the propagation loss with respect to electric signals of high frequency becomes large on the side of the signal electrode 131B where the input leader line portion is curved. Therefore the modulation band width of the optical modulation section 120B becomes narrower than the modulation band width of the optical modulation sections 120A. When in order to widen the modulation band width of the optical modulation section 120B, the length of the portion where the light and electric field interact with each other (hereunder called the interaction portion) on the optical modulation section 120B side is made short, the drive voltage is increased. Therefore a problem arises in that as well as a high output driver amplifier being necessary, the power consumption of the optical modulator is increased.

Furthermore, in the configuration of FIG. 2, in order detour the input leader line portion of the signal electrode 131B on the substrate 100, it is necessary to widen the width of the substrate 100. Here the width of the substrate 100 is the length of the substrate 100 in the perpendicular direction (the y direction in the figure) with respect to the propagation direction (the x direction in the figure) of the light in the interaction portion of the respective optical modulation sections 120A and 120B. When in order to reduce the delay amount in the signal electrode 131B and to narrow the width of the substrate 100, the spacing of the input leader line portions of the respective signal electrodes 131A and 131B is made narrow, cross talk of the electric signals between the respective signal electrodes 131A and 31B is likely to occur. Therefore the noise component of the signal light output from the output port Pout increases. Furthermore, the earth electrode (common to both 132A and 132B) located between the input leader line portions of the respective signal electrodes 131A and 131B becomes narrow. Therefore the high frequency response characteristic of the signal electrodes 131A and 131B also deteriorates.

SUMMARY

According to an aspect of the invention, an optical modulator includes a plurality of optical modulation sections which are arranged in parallel on a same main substrate having an electro-optic effect, in the respective optical modulation sections, a Mach-Zehnder type optical wave guide is formed on the main substrate, and a signal electrode and an earth electrode are provided along a pair of branching waveguides that are disposed between an optical branching section and an optical multiplexing section of the Mach-Zehnder type optical waveguide, that perform modulation of light that propagates on the Mach-Zehnder type optical waveguide by applying an electric signal corresponding to modulation data to the signal electrode that is a travelling wave electrode. This optical modulator includes, arranged on the main substrate; an output light multiplexing section that multiplexes modulation light that has been respectively output from the optical modulation sections, an intermediate substrate that is provided separately to the main substrate, and a plurality of signal lines formed on the intermediate substrate respectively corresponding to the optical modulation sections. Furthermore, in the signal electrodes of the respective optical modulation sections on the main substrate, each of the input ends to which an electric signal is applied are arranged side by side on one side face of the main substrate. Moreover, in the respective signal lines on the intermediate substrate, each of the input ends to which an electric signal is applied from outside, respectively corresponding to the optical modulations sections, are arranged side by side with a predetermined spacing on one side face of the intermediate substrate, and each of the output ends that are electrically connected to the input ends of the signal electrodes of the corresponding optical modulation section on the main substrate are arranged side by side on the other side face of the intermediate substrate, and each of the electrical lengths from the input end to the output end are different to each other. Furthermore, the construction is such that, when on the branching wave guides that run along the signal electrodes, of the pair of branching wave guides of the respective optical modulation sections, base points where optical path lengths from the output light multiplexing sections are equal to each other, are set individually, the electrical lengths of the signal lines respectively corresponding to the optical modulation sections, from the input end of the signal line on the intermediate substrate through the input end of the signal electrode on the main substrate connected to the output end of the signal line, to the base point on the signal electrode, become equal to each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereunder is a detailed description of embodiments of the invention, with reference to the drawings.

Figure 3:
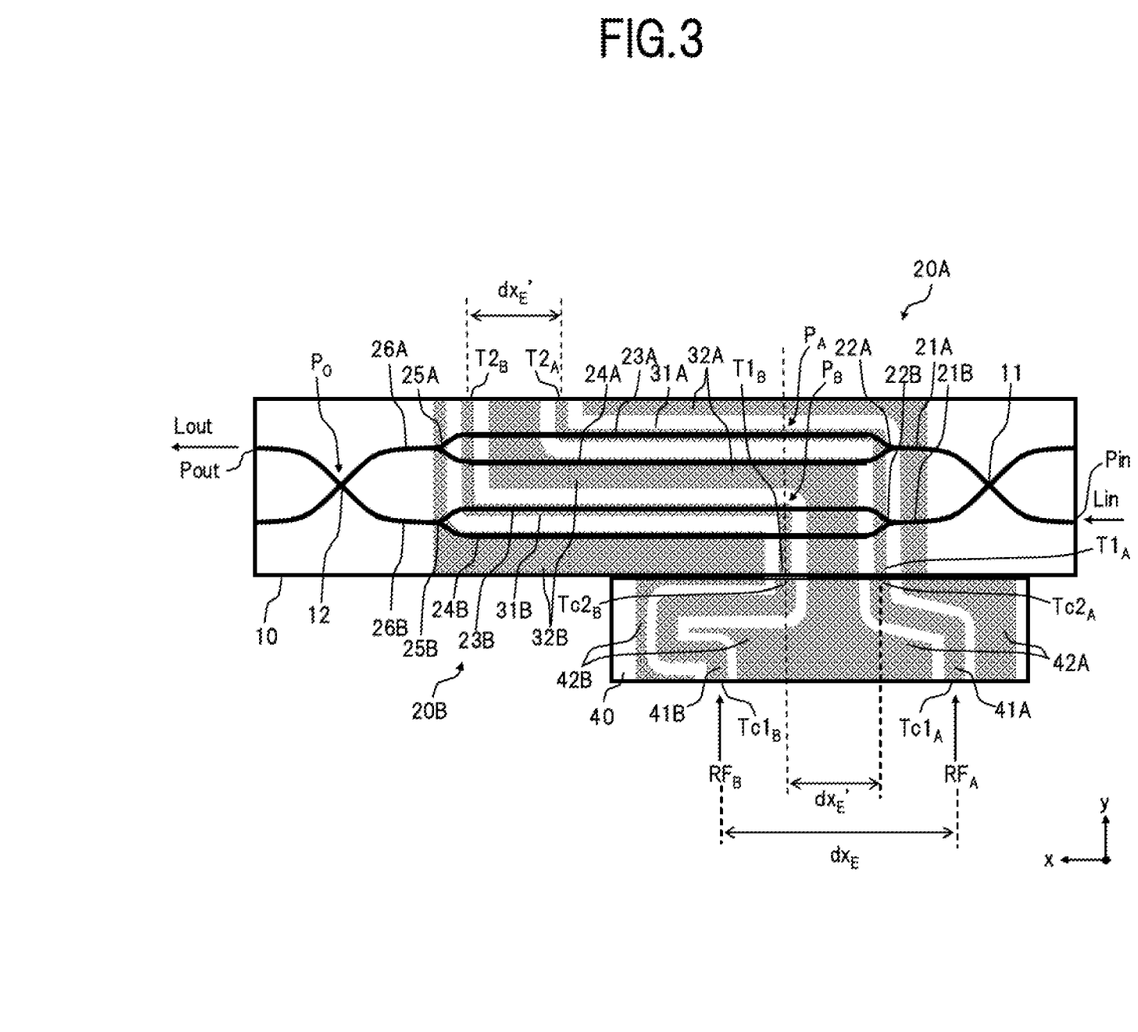
FIG. 3 is a plan view illustrating a configuration of an optical modulator according to a first embodiment.

FIG. 3 is a plan view illustrating a configuration of an optical modulator according to a first embodiment.

In FIG. 3, the optical modulator of this embodiment, includes for example; a main substrate 10 formed with two optical modulation sections 20A and 20B, and an intermediate substrate 40 proved separate to the main substrate 10 for performing connection between input ends $T1_A$ and $T1_B$ of signal electrodes 31A and 31B of the respective optical modulation sections 20A and 20B, and the outside.

The main substrate 10 is a Z-cut crystal of, for example, $LiNbO_3$ or $LiTaO_2$ having an electro-optic effect. On one end face thereof (the right end face in the figure) is arranged a single input port Pin that is common with the respective optical modulation sections 20A and 20B, and on the other end face (the left end face in the figure) there is arranged a single output port Pout that outputs to the outside, signal light that has been generated by multiplexing modulation light of the respective optical modulation sections 20A and 20B. Also in the respective embodiments described below, similarly to the aforementioned case of FIG. 2, the propagation direction (the longitudinal direction of the main substrate 10) of the light in the interaction portions of the respective optical modulation sections 20A and 20B is the x direction, and the direction perpendicular to the x direction is the y direction.

One optical input end of an input optical branching section 11 that uses a 2×2 optical coupler is connected to the input port Pin, and two optical output ends of the input optical branching section 11 are respectively connected to input waveguides 21A and 21B of the optical modulation sections 20A and 20B. The input optical branching section 11 branches the input light into two at a required intensity ratio, and outputs this. Here the example is shown for where the input light Lin from the input port Pin is applied to the light input end positioned on the lower side in the figure of the input optical branching section 11. However the input light Lin may be applied to the light input end positioned on the upper side in the figure. Furthermore, instead of the 2×2 optical coupler, it is also possible to configure the input optical branching section 11 using a Y branching wave guide.

The optical modulation section 20A is formed on the surface portion located on the upper side in the figure of the main substrate 10, and is provided with: a Mach-Zehnder (MZ) type optical waveguide comprising an input waveguide 21A, an optical branching section 22A, a pair of branching waveguides 23A and 24A, an optical multiplexing section 25A, and an output waveguide 26A; and a signal electrode 31A and an earth electrode 32A that are patterned along the pair of branching waveguides 23A and 24A.

The input waveguide 21A has one end connected to one light output end of the input optical branching section 11, and the other end is connected to the light input end of the optical branching section 22A.

In the optical branching section 22A, light propagated on the input waveguide 21A is branched into two at an intensity ratio of 1:1. To the two light output ends of the optical branching section 22A is respectively connected each end of the pair of branching waveguides 23A and 24A.

In the pair of branching waveguides 23A and 24A, the branching waveguide 23A positioned on the upper side in the figure, and the branching waveguide 24A positioned on the lower side in the figure, are parallel with the x direction.

In the optical multiplexing section 25A, the two light input ends are respectively connected to the other ends of the branching waveguides 23A and 24A, and the lights propagated on the branching waveguides 23A and 24A are multiplexed into one. To the one light output end of the optical multiplexing section 25A is connected one end of the output waveguide 26A.

The signal electrode 31A is formed along directly above the branching waveguide 23A. The earth electrode 32A is separated from the signal electrode 31A, and also is formed to include the portion along directly above the branching waveguide 24A. Here the earth electrode 32A formed between the branching waveguide 24A and a later described branching waveguide 23B of the optical modulation section 20B, is common to a later described earth electrode 32B of the optical modulation section 20B.

The signal electrode 31A constitutes a travelling wave electrode in which an output end $T2_A$ leading to one side face (the side face on the upper side in the figure) of the opposite side faces parallel with the longitudinal direction of the substrate 10, is connected to the earth electrode 32A via a resistor (not illustrated in the figure). An output end $Tc2_A$ of a later mentioned signal line 41A formed on the intermediate substrate 40, is electrically connected to an input end $T1_A$ that is led out to the other side face (the side face on the lower side in the figure) of the main substrate 10, and a microwave electric signal $RF_A$ (electric signal corresponding to modulation data) propagated on the signal line 41A is output to the input end $T1_A$ of the signal electrode 31A. The cross-section shape of the signal electrode 31A from the input end $T1_A$ to the output end $T2_A$ is here made roughly uniform in order to simplify design for impedance matching and the like.

For the signal electrode 31A and the earth electrode 32A, these may be formed on the main substrate 10 (optical waveguide) via a buffer layer that uses $SiO_2$ or the like (not illustrated in the figure). By providing a buffer layer, the light propagated within the branching waveguides 23A and 24A can be prevented from being absorbed by the signal electrode 31A and the earth electrode 32A.

The optical modulation section 20B is formed on the surface portion located on the lower side in the figure of the main substrate 10, and is provided with: a Mach-Zehnder (MZ) type optical waveguide comprising an input waveguide 21B, an optical branching section 22B, a pair of branching waveguides 23B and 24B, an optical multiplexing section 25B, and an output waveguide 26B; and a signal electrode 31B and an earth electrode 32B that are patterned along the pair of branching waveguides 23B and 24B.

The input waveguide 21B has one end connected to the other light output end of the input optical branching section 11, and the other end is connected to the light input end of the optical branching section 22B.

In the optical branching section 22B, light propagated on the input waveguide 21B is branched into two at an intensity ratio of 1:1. To the two light output ends of the optical branching section 22B is respectively connected each end of the pair of branching waveguides 23B and 24B.

In the pair of branching waveguides 23B and 24B, the branching waveguide 23B positioned on the upper side in the figure, and the branching waveguide 24B positioned on the lower side in the figure, are parallel with the x direction.

In the optical multiplexing section 25B, the two light input ends are respectively connected to the other ends of the branching waveguides 23B and 24B, and the lights propagated on the branching waveguides 23B and 24B are multiplexed into one. To the one light output end of the optical multiplexing section 25A is connected one end of the output waveguide 26B.

The signal electrode 31B is formed along directly above the branching waveguide 23B. The earth electrode 32B is separated from the signal electrode 31B, and also is formed to include the portion along directly above the branching waveguide 24B. Here the earth electrode 32B formed between the branching waveguide 23B and the branching waveguide 24A of the optical modulation section 20A, is common to the earth electrode 32A of the optical modulation section 20A.

The signal electrode 31B constitutes a travelling wave electrode in which an output end $T2_B$ leading to one side face (the side face on the upper side in the figure) of the opposite side faces parallel with the longitudinal direction of the main substrate 10, is connected to the earth electrode 32B via a resistor (not illustrated in the figure). An output end $Tc2_B$ of a later mentioned signal line 41B formed on the intermediate substrate 40, is electrically connected to an input end $T1_B$ that is led out to the other side face (the side face on the lower side in the figure) of the main substrate 10, and a microwave electric signal $RF_B$ (electric signal corresponding to modulation data) propagated on the signal line 41B is output to the input end $T1_B$ of the signal electrode 31B. The cross-section shape of the signal electrode 31B from the input end $T1_B$ to the output end $T2_B$ is here made roughly uniform in order to simplify design for impedance matching and the like. Also for the signal electrode 31B and the earth electrode 32B, these may be formed on the main substrate 10 (optical waveguide) via a buffer layer in the same way as for the case described above.

In the respective optical modulation sections 20A and 20B, the other end of each of the output waveguides 26A and 26B is respectively connected to the two light input ends of the output optical multiplexing section 12 that uses the 2×2 optical coupler. In the output optical multiplexing section 12, after multiplexing the modulation light output from the respective optical modulation sections 20A and 20B into one, this is bifurcated, and the signal light that is guided to one light output end of the two light output ends, is output to the outside from the output port Pout. Here the example is shown for where the signal light that is guided to the light output end positioned at the upper side in the figure of the output optical multiplexing section 12, is the output light Lout of the main optical modulator. However, the signal light that is guided to the light output end positioned at the lower side in the figure may be made the output light Lout of the main optical modulator. Furthermore, instead of the 2×2 optical coupler, it is also possible to configure the output optical multiplexing section 12 using a Y branching wave guide.

In the respective optical modulation sections 20A and 20B on the main substrate 10 constructed as described above, then similar to the aforementioned case illustrated in FIG. 2, the input ends $T1_A$ and $T1_B$ of each of the signal electrodes 31A and 31B are provided side by side on one side face of the opposite side faces of the main substrate 10. However, regarding the spacing $dx_E'$ of the respective input ends $T1_A$ and $T1_B$, since the connection with the outside such as an electrode input terminal of a package (not illustrated in the figure) is performed via the intermediate substrate 40, then this can be narrower than the spacing $dx_E$ for the case of FIG. 2 where connection with the outside is made directly.

In the spacing $dx_E'$ of the input ends $T1_A$ and $T1_B$ of the respective signal electrodes 31A and 31B, sufficient earthing can be obtained in the earth electrode located between the input leader line portions of the respective signal electrodes 31A and 31B, and it is possible to make this as narrow as a spacing in which cross talk between the electric signals $RF_A$ and $RF_B$ propagating on the respective signal electrodes 31A and 31B can be substantially suppressed. However, it is necessary to ensure a region for connection with the intermediate substrate 40 (for example by bonding with wire or the like). More specifically, if the electrode width in the input ends $T1_A$ and $T1_B$ of the respective signal electrodes 31A and 31B is W, and the spacing (gap) between the respective signal electrodes 31A and 31B and the earth electrodes 32A and 32B is S, then preferably the spacing $dx_E'$ of the center lines of each of the input ends $T1_A$ and $T1_B$ of the respective signal electrodes 31A and 31B is 2×(W+S) or more.

Furthermore, here, also for the output ends $T2_A$ and $T2_B$ of the respective signal electrodes 31A and 31B, similar to the input ends $T1_A$ and $T1_B$ mentioned above, these are provided side by side on the other side face of the opposite side faces of the main substrate 10. Preferably the spacing of the respective output ends $T2_A$ and $T2_B$ is approximately equal to the spacing $dx_E'$ of the input ends $T1_A$ and $T1_B$. Furthermore, preferably the electric lengths from the input ends $T1_A$ and $T1_B$ of the respective signal electrodes 31A and 31B to the output ends $T2_A$ and $T2_B$ are also approximately equal to each other. As a result, in the respective signal electrodes 31A and 31B, the relative positions of the input ends $T1_A$ and $T1_B$ and the output ends $T2_A$ and $T2_B$ become the same, and hence inspection and mounting of the main substrate 10 becomes easy.

In the intermediate substrate 40, the signal lines 41A and 41B and the earth electrodes 42A and 42B are formed on the surface thereof. In the intermediate substrate 40, the propagation loss per unit length of the respective signal lines 41A and 41B also includes a high frequency component. Therefore, the substrate material is selected and the cross-section shape of the signal line is designed, in order make this less than the propagation loss per unit length of the respective signal electrodes 31A and 31B on the main substrate 10.

More specifically, by selecting the material so that, for example, the dielectric constant of the intermediate substrate 40 is lower than the dielectric constant of the main substrate 20, the width of the respective signal lines 41A and 41B on the intermediate substrate 40 can be set wider than the width of the respective signal electrodes 31A and 31B on the main substrate 10, so that it is possible to reduce the propagation loss per unit length in the respective signal lines 41A and 41B. Furthermore, it is also effective for example to select the material so that the dissipation factor (tan δ) of the intermediate substrate 40 becomes lower than tan δ of the main substrate 20, and hence the dielectric loss in the intermediate substrate 40 is made less than in the main substrate 10, and the bands of the respective signal lines 41A and 41B are widened (high frequency response characteristics are improved).

The main material used in the main substrate 10 and the intermediate substrate 40 is preferably the same material. As a result, even in the case where the ambient temperature of the optical modulator changes, since the refractive indices of the main substrate 10 and the intermediate substrate 40 are basically the same, then even if the lengths of the respective signal lines 41A and 41B formed on the intermediate substrate 40 as described above are different, it is possible to avoid the situation where the timings of the modulation lights of the respective optical modulation sections 20A and 20B are shifted due to temperature change.

In the respective signal lines 41A and 41B, the input ends $Tc1_A$ and $Tc1_B$ are arranged on one side face of the opposite side faces that are parallel in the x direction of the intermediate substrate 40 (the side face on the lower side in the figure), and the output ends $Tc2_A$ and $Tc2_B$ are arranged on the other side face (the side face on the upper side in the figure). Near the input ends $Tc1_A$ and $Tc1_B$ of the respective signal lines 41A and 41B there is formed an electrode pad for connecting to the outside such as to electrode input terminals of a package (not illustrated in the figure). The spacing $dx_E$ of the input ends $Tc1_A$ and $Tc1_B$ is matched with the spacing of the electrode input terminals of the package, and is wider than the spacing $dx_E'$ of the input ends $T1_A$ and $T1_B$ of the respective signal electrodes 31A and 31B on the main substrate 10 as mentioned before. On the other hand, the spacing of the output ends $Tc2_A$ and $Tc2_B$ of the respective signal lines 41A and 41B, is matched with the spacing of the input ends $T1_A$ and $T1_B$ in order to connect to the input ends $T1_A$, and $T1_B$ of the respective signal electrodes 31A and 31B on the main substrate 10.

Regarding the electrode pattern between the input ends $Tc1_A$ and $Tc1_B$ and $Tc2_A$ and $Tc2_B$ of the respective signal lines 41A and 41B, when the electric signals $RF_A$ and $RF_B$ are applied simultaneously to the input ends $Tc1_A$ and $Tc1_B$, then in order to synchronize these with the modulation lights output from the respective optical modulation sections 20A and 20B on the main substrate 10, here one signal line 41B is made a detour pattern of an approximate C shape. That is, the respective signal lines 41A and 41B have different electrical lengths, and a delay is given to the electric signal $RF_B$ that propagates on the signal line 41B. As a result, in the case where the point where the modulation lights of the respective optical modulation sections 20A and 20B are multiplexed by the output optical multiplexing section 12 is $P_O$, and the points on the respective branching waveguides 23A and 23B where the optical path lengths from the point $P_O$ becomes equal are $P_A$ and $P_B$ (here the point where the branching waveguide 23B of the optical modulation section 20B and the input leader line portion of the signal electrode 31B intersect is made a base, and the points where the optical path lengths from the point $P_O$ become equal are $P_A$ and $P_B$), the electrical length of the signal line from the input end $Tc1_A$ of the signal line 41A through the input end $T1_A$ of the signal electrode 31A to the point $P_A$, and the electrical length of the signal line from the input end $Tc1_B$ of the signal line 41B through the input end $T1_B$ of the signal electrode 31B to the point $P_B$, are equal to each other.

The earth electrodes 42A and 42B are formed on the intermediate substrate 40 separated from the respective signal lines 41A and 41B, and form a coplanar electrode between the signal lines 41A and 41B. Here the earth electrodes 42A and 42B formed between the respective signal lines 41A and 41B are common. The earth electrodes 42A and 42B are electrically connected on the surface of a part adjacent to each of the respective earth electrodes 32A and 32B on the main substrate 10.

The characteristic impedance of the signal lines 41A and 41B on the intermediate substrate 40 (hereunder called the impedance of the intermediate substrate 40) is made equal to the characteristic impedance of the signal electrodes 31A and 31B on the main substrate 10 (hereunder called the impedance of the main substrate 10). However, in the case where the impedance of the main substrate 10 is different to the impedance of an external connector used for the package electrode input terminal or the like connected to the input ends $Tc1_A$ and $Tc1_B$ of the respective signal lines 41A and 41B, then the impedance of the intermediate substrate 40 may be set to a middle value between the impedance of the main substrate 10 and the impedance of the external connector. That is, the impedance of the intermediate substrate 40 may be smaller than the impedance of the main substrate 10 and greater than the impedance of the external connector, or greater than the impedance of the main substrate 10 and smaller than the impedance of the external connector. As a result, it is possible to alleviate discrepancies in the impedance between different materials, including manufacturing variations in the impedances of the main substrate 10, the intermediate substrate 40, and the external connector.

In the respective signal lines 41A and 41B on the intermediate substrate 40 as described above, each of the lengths are different. Therefore if the propagation losses per unit length are different for on the main substrate 10 side and on the intermediate substrate 40 side, the modulation band widths of the respective optical modulation sections 20A and 20B will become different. In order to prevent this, for the respective signal electrodes 31A and 31B on the main substrate 10 side, if the loss per unit length is am, and the lengths of the portions from the input ends $T1_A$ and $T1_B$ to the points $P_A$ and $P_B$ are $Lm_A$ and $Lm_B$, and for the respective signal lines 41A and 41B on the intermediate substrate 40 side, if the loss per unit length is $\alpha c$, and the lengths from the input ends $Tc1_A$ and $Tc1_B$ to the output ends $Tc2_A$ and $Tc2_B$ are $Lc_A$ and $Lc_B$, then it is preferable to set the cross-section shape of the signal electrodes 31A and 31B and the signal lines 41A and 41B in order to realize $\alpha m$ and $\alpha c$ that satisfy the following relationship shown in equation 1.

$$\alpha c \times Lc_A + \alpha m \times Lm_A = \alpha c \times Lc_B + \alpha m \times Lm_B \qquad (1)$$

Next is a description of the operation of the optical modulator according to the first embodiment.

At first, light Lin output from a single light source or the like (not illustrated in the figure) is input to the input optical branching section 11 from the input port Pin of the present optical modulator. The input light Lin is bifurcated according to a required intensity ratio by the input optical branching section 11, and input to the input waveguides 21A and 21B of the respective optical modulation sections 20A and 20B.

In the optical modulation section 20A, the light input to the input waveguide 21A is bifurcated in the optical branching section 22A according to an intensity ratio of 1:1, and respectively sent to the branching waveguides 23A and 24A. Here, an electric signal $RF_A$ is applied from the input end $Tc1_A$ of the signal line 41A on the intermediate substrate 40, and after the electric signal $RF_A$ has propagated on the signal line 41A, it is applied to an input end $T1_A$ of the signal electrode 31A on the main substrate 10, and propagated on the signal electrode 31A. As a result, light that has been modulated corresponding to the level of the electric signal $RF_A$ passes through the output waveguide 26A and is output to the output optical multiplexing section 12.

Moreover, in the optical modulation section 20B also, in the same way as the optical modulation section 20A, the light input to the input waveguide 21B is bifurcated in the optical branching section 22B according to an intensity ratio of 1:1, and respectively sent to the branching waveguides 23B and 24B. Simultaneous with applying the electric signal $RF_A$ to the input end $Tc1_A$ of the signal line 41A, the electric signal $RF_B$ is applied to the input end $Tc1_B$ of the signal line 41B on the intermediate substrate 40, and after the electric signal $RF_B$ has propagated on the signal line 41B, it is applied to an input end $T1_B$ of the signal electrode 31B on the main substrate 10, and propagated on the signal electrode 31B. As a result, light that has been modulated corresponding to the level of the electric signal $RF_B$ passes through the output waveguide 26B and is output to the output optical multiplexing section 12.

At this time, the electrical length of the signal line from the input end $Tc1_B$ of the signal line 41B through the input end $T1_B$ of the signal electrode 31B to the point $P_B$ positioned on branching waveguide 23B is equal to the electrical length of the signal line from the input end $Tc1_A$ of the signal line 41A through the input end $T1_A$ of the signal electrode 31A to the point $P_A$ positioned on the branching waveguide 23A. Therefore the timing for the electric signal $RF_B$ on the optical modulation section 20B side to reach the point $P_B$ is substantially the same as the timing for the electric signal $RF_A$ on the optical modulation section 20A side to reach the point $P_A$. Consequently, synchronized modulation light is output from the respective optical modulation sections 20A and 20B to the output optical multiplexing section 12. In the output optical multiplexing section 12, the modulation light from the optical modulation sections 20A and 20B is multiplexed into one and then bifurcated, and one signal light Lout is output to the outside from the output port Pout.

According to the optical modulator of the first embodiment as described above, even if two optical modulation sections 20A and 20B are arranged in parallel on the main substrate 10, and the input ends $T1_A$ and $T1_B$ of each of the signal electrodes 31A and 31B are arranged side by side on one side face of the main substrate 10, synchronized modulation light can be output from the respective optical modulation sections 20A and 20B. In the respective modulation lights, since the high frequency inclusive propagation loss in the respective signal lines 41A and 41B on the intermediate substrate 40 is lower than on the main substrate 10 side, a wide modulation band is ensured. Furthermore, since the interaction portions of the respective optical modulation sections 20A and 20B are the same length, there is also no cause for an increase in drive voltage. Moreover, since sufficient earthing is achieved in the earth electrodes positioned between the signal electrodes 31A and 31B on the main substrate 10, and cross talk between the signal electrodes 31A and 31B is suppressed, a low noise signal light Lout can be output. In addition, since the signal line 41B is detoured on the intermediate substrate 40 to adjust the electrical length, so that a detour of the signal electrode on the main substrate 10 is not necessary, the width of the main substrate 10 can be made narrow. If the width of the main substrate 10 is made narrow, then even more chips can be obtained when cutting out a plurality of chips (main substrate 10) from a signal wafer, and hence a cost reduction of the optical modulator is possible.

In the first embodiment, an example is shown for where the cross-sectional shape of the respective signal electrodes 31A and 31B on the main substrate 10 are approximately the same from the input ends $T1_A$ and $T1_B$ to the output ends $T2_A$ and $T2_B$, so that design for impedance matching and the like is facilitated. However the invention is not limited to this. For example, in the case where the propagation loss in the portion (the interaction portion) running along above the respective branching waveguides 23A and 23B of the respective signal electrodes 31A and 31B is great, then the thickness of the electrodes in the portions from the input ends $T1_A$ and $T1_B$ of the respective signal electrodes 31A and 31B to the points $P_A$ and $P_B$ on the respective branching waveguides 23A and 23B may be made greater than the thickness of the electrodes of the other portions, or, the spacing between the signal electrode and the earth electrode in the portion from the input ends $T1_A$ and $T1_B$ to the points $P_A$ and $P_B$ may be made wider than the spacing between the signal electrode and the earth electrode in the other portions. As a result, the propagation loss in the portions from the input ends $T1_A$ and $T1_B$ of the respective signal electrodes 31A and 31B to the points $P_A$ and $P_B$ can be reduced, and hence it is possible to have a wide band.

Next is a description of a second embodiment.

Figure 4:
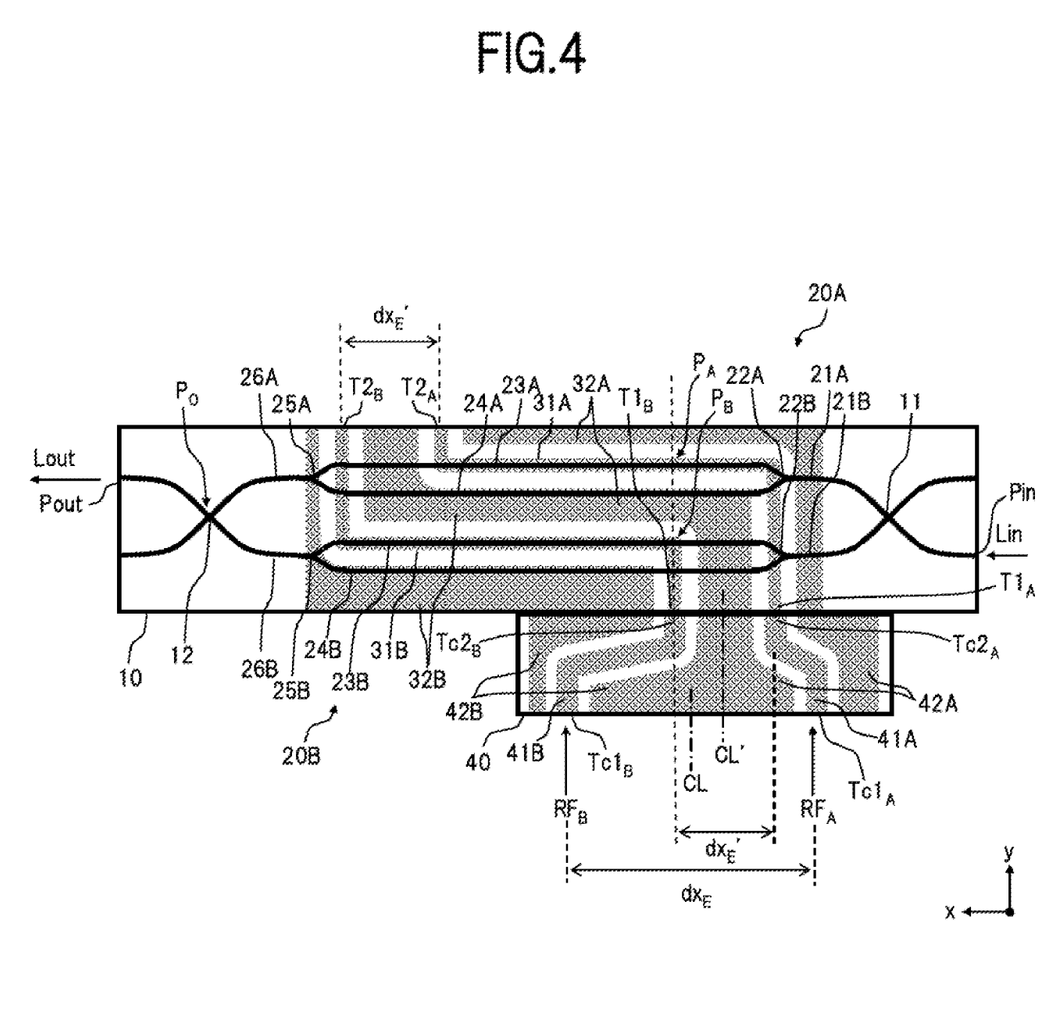
FIG. 4 is plan view illustrating a configuration of an optical modulator according to a second embodiment.

FIG. 4 is a plan view illustrating a configuration of an optical modulator according to the second embodiment. Parts the same as or corresponding to the configuration of the first embodiment illustrated in FIG. 3 are denoted by the same reference symbols and description is omitted. The same also applies for subsequent other embodiments.

In FIG. 4, the point where the configuration of the optical modulator of this embodiment is different to the case of the first embodiment, is that the wiring pattern of the respective signal lines 41A and 41B on the intermediate substrate 40 is changed, and the center line CL between the input ends $Tc1_A$ and $Tc1_B$ of the respective signal lines 41A and 41B is shifted from the center line CL' between the input ends $T1_A$ and $T1_B$ of the respective signal electrodes 31A and 31B on the main substrate 10.

In the case of the first embodiment illustrated in FIG. 3, the center lines CL and CL' are made to coincide, and the spacing of the input ends $Tc1_A$ and $Tc1_B$ is made a necessary spacing $dx_E$ to connect to the outside. Therefore, one signal line 41B on the intermediate substrate 40 is made a detour pattern of an approximate C shape. Hence, the size of the intermediate substrate 40 must be relatively large. Therefore, in the second embodiment, by allowing the center line CL on the intermediate substrate 40 side to be shifted to the left in the figure with respect to the center line CL' on the main substrate 10 side, the situation where the signal line 41B becomes a detour pattern of an approximate C shape is avoided. As a result, it is possible to reduce the size of the intermediate substrate 40 in both the x direction and the y direction, and the pattern design for the respective signal lines 41A and 41B on the intermediate substrate 40 can also be simplified.

Next is a description of a third embodiment.

Figure 5:
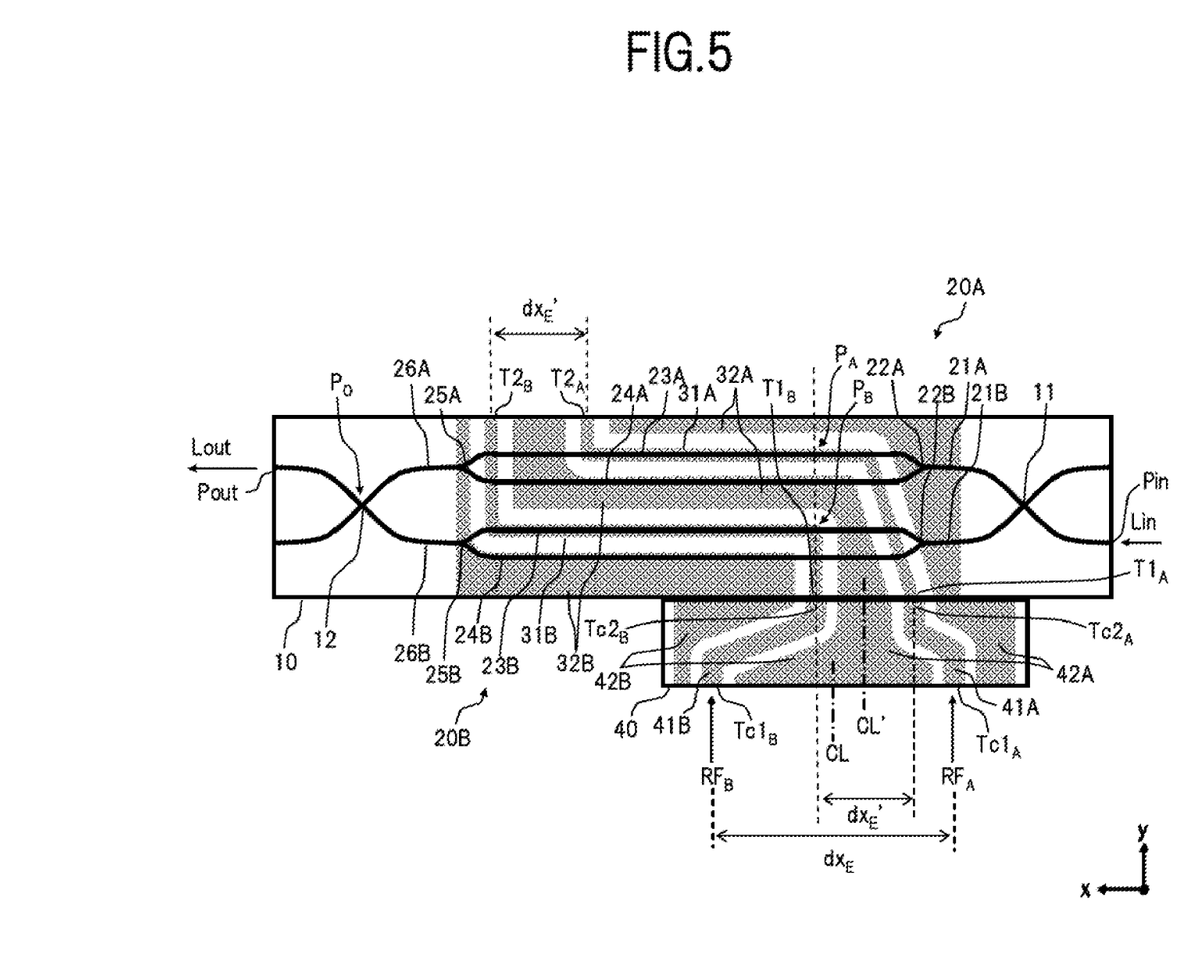
FIG. 5 is a plan view illustrating a configuration of an optical modulator according to a third embodiment.

FIG. 5 is a plan view illustrating a configuration of an optical modulator according to the third embodiment.

In FIG. 5, in the optical modulator of this embodiment, the input leader line portion in the configuration of the second embodiment illustrated in FIG. 4, from the input end $T1_A$ of the signal electrode 31A on the main substrate 10 to the intersection point with the branching waveguide 23A, is bent at an angle with respect to the y direction to give an inclined wiring.

As a result, the electrical length of the signal line from the input end $T1_A$ of the signal electrode 31A to the point $P_A$ on the branching waveguide 23A is shortened. Therefore the difference in the electrical lengths in the respective signal lines 41A and 41B on the intermediate substrate 40, that is, the delay amount in the intermediate substrate 40 can be reduced. Consequently, it is possible to make the size of the intermediate substrate 40 even smaller in the y direction.

Next is a description of a fourth embodiment.

In the above first through third embodiments, the description was for an optical modulator in which two optical modulation sections were arranged in parallel on the main substrate. However the present invention is also applicable to a parallel arrangement of three or more optical modulation sections. Therefore, in the fourth embodiment, an application example is described for where, for example, three optical modulation sections are arranged in parallel on the main substrate.

Figure 6:
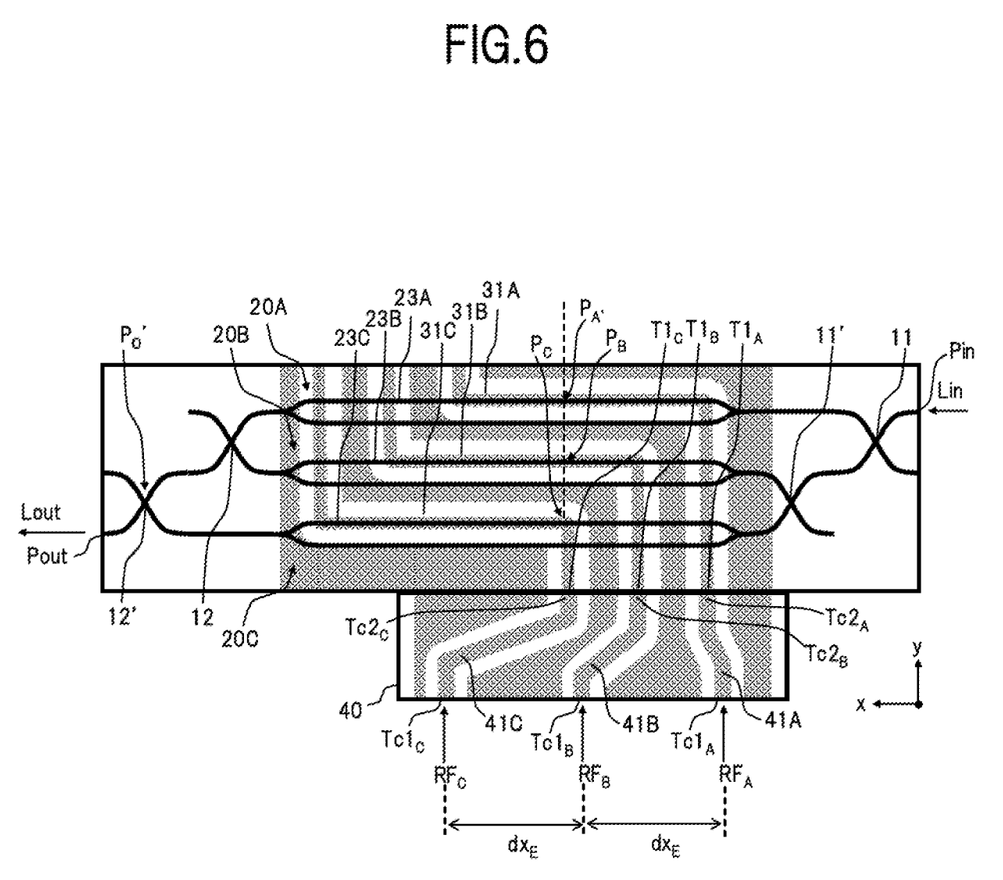
FIG. 6 is a plan view illustrating a configuration of an optical modulator according to a fourth embodiment.

FIG. 6 is plan view illustrating a configuration of an optical modulator according to the fourth embodiment.

In FIG. 6, in the optical modulator of this embodiment, for example, in the configuration of the aforementioned second embodiment illustrated in FIG. 4, an optical modulation section 20C of a similar construction to the optical modulation sections 20A and 20B is added on the main substrate 10. The optical modulation section 20C is here arranged in parallel on the lower side of the optical modulation section 20B, and an input end $T1_C$ of a signal electrode 31C thereof is arranged on one side face of the main substrate 10, side by side with input ends $T1_A$ and $T1_B$ of signal electrodes 31A and 31B of respective optical modulation sections 20A and 20B. Light that has been sent to the optical modulation section 20B side, of input light that is bifurcated by an input optical branching section 11, is further bifurcated by an input optical branching section 11' and is input to the optical modulation section 20C. Furthermore, the modulation light output from the optical modulation section 20C, is sent to a light input end of an output optical multiplexing section 12' to which is applied light of the modulation light of the optical modulation sections 20A and 20B that has been multiplexed in an output optical multiplexing section 12, and the signal light that has been multiplexed in the output optical multiplexing section 12' is output to the output port Pout.

On the intermediate substrate 40 is added a signal line 41C corresponding to the optical modulation section 20C. An input end $Tc1_C$ of the signal line 41C is arranged on one side face of the intermediate substrate 40, side by side with input ends $Tc1_A$ and $Tc1_B$ of the respective signal lines 41A and 41B, and the spacing to an adjacent input end $Tc1_B$ becomes $dx_E$ the same as the spacing of the input ends $Tc1_A$ and $Tc1_B$. Furthermore, an output end $Tc2_C$ of the signal line 41C is arranged on the other side face of the intermediate substrate 40, side by side with output ends $Tc2_A$ and $Tc2_B$ of the respective signal lines 41A and 41B, and is electrically connected to an input end $T1_C$ of the signal line 31C on the main substrate 10. Similarly to the case of the second embodiment, the center line between the input ends $Tc1_B$ and $Tc1_C$ of the respective signal lines 41B and 41C is shifted from the center line between the input ends $T1_B$ and $T1_C$ of the respective signal electrodes 31B and 31C on the main substrate 10.

Regarding the electrical length of the signal line 41C, when the electric signals $RF_A$ to $RF_C$ are applied simultaneously to the input ends $Tc1_A$ to $Tc1_C$ of the respective signal lines 41A to 41C, then in order to synchronize these with the modulation lights output from the respective optical modulation sections 20A to 20C on the main substrate 10, this is made even longer than the electrical length of the signal line 41B. As a result, in the case where the multiplexing point in the output optical multiplexing section 12' is $P_O{}'$, and the points on the respective branching wave guides 23A, 23B, and 23C where the optical path lengths from the point $P_O{}'$ become equal are $P_A{}'$, $P_B{}'$, and $P_C$ (here the point where the branching waveguide 23C of the optical modulation section 20C and the input leader line portion of the signal electrode 31C intersect is made a base), the electrical length of the signal line from the input end $Tc1_A$ of the signal line 41A through the input end $T1_A$ of the signal electrode 31A to the point $P_A{}'$, the electrical length of the signal line from the input end $Tc1_B$ of the signal line 41B through the input end $T1_B$ of the signal electrode 31B to the point $P_B{}'$, and the electrical length from the input end $Tc1_C$ of the signal line 41C through the input end $T1_C$ of the signal electrode 31C to the point $P_C$ are equal to each other.

Also in the optical modulator where three optical modulation sections 20A to 20C are arranged in parallel on the main substrate 10 as described above, a similar effect to the case of the second embodiment can be obtained. By a similar way of thinking to this embodiment, the invention can also be applied to the case where four or more optical modulation sections are arranged in parallel.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical modulator comprising a plurality of optical modulation sections which are arranged in parallel on a same main substrate having an electro-optic effect, in the respective optical modulation sections, a Mach-Zehnder type optical wave guide is formed on the main substrate, and a signal electrode and an earth electrode are provided along a pair of branching waveguides that are disposed between an optical branching section and an optical multiplexing section of the Mach-Zehnder type optical waveguide, that perform modulation of light that propagates on the Mach-Zehnder type optical waveguide by applying an electric signal corresponding to modulation data to the signal electrode that is a travelling wave electrode, wherein:

the optical modulator comprises, arranged on the main substrate;

an output light multiplexing section that multiplexes modulation light that has been respectively output from the optical modulation sections, an intermediate substrate that is provided separately to the main substrate, and a plurality of signal lines formed on the intermediate substrate respectively corresponding to the optical modulation sections, and in the signal electrodes of the respective optical modulation sections on the main substrate, each of the input ends to which an electric signal is applied are arranged side by side on one side face of the main substrate, and in the respective signal lines on the intermediate substrate, each of the input ends to which an electric signal is applied from outside, respectively corresponding to the optical modulations sections, are arranged side by side with a predetermined spacing on one side face of the intermediate substrate, and each of the output ends that are electrically connected to the input ends of the signal electrodes of the corresponding optical modulation section on the main substrate are arranged side by side on the other side face of the intermediate substrate, and each of the electrical lengths from the input end to the output end are different to each other, and wherein the construction is such that, when on the branching wave guides that run along the signal electrodes, of the pair of branching wave guides of the respective optical modulation sections, base points where optical path lengths from the output light multiplexing sections are equal to each other, are set individually, the electrical lengths of the signal lines respectively corresponding to the optical modulation sections, from the input end of the signal line on the intermediate substrate through the input end of the signal electrode on the main substrate connected to the output end of the signal line, to the base point on the signal electrode, become equal to each other.

2. An optical modulator according to claim 1, wherein in the signal electrodes of the respective optical modulation sections on the main substrate, the spacing of adjacent input ends is narrower than the arrangement spacing of the input ends of the respective signal lines on the intermediate substrate.

3. An optical modulator according to claim 2, wherein in the signal electrodes of the respective optical modulation sections on the main substrate, when the electrode width in the input ends is W, and the spacing to the earth electrode is S, then the spacing of the center lines of the adjacent input ends of the signal electrodes is $2\times(W+S)$ or more.

4. An optical modulator according to claim 1, wherein the propagation loss per unit length in the respective signal lines on the intermediate substrate is less than the propagation loss per unit length in the signal electrodes of the respective optical modulation sections on the main substrate.

5. An optical modulator according to claim 4, wherein the intermediate substrate has a dielectric constant that is lower than the dielectric constant of the main substrate.

6. An optical modulator according to claim 4, wherein the intermediate substrate has a dissipation factor (tan δ) that is lower than a dissipation factor of the main substrate.

7. An optical modulator according to claim 1, wherein the cross-section shapes of the signal lines and the signal electrodes are set so that generation amounts of propagation loss in the signal lines respectively corresponding to the optical modulation sections, from input ends of the signal lines on the intermediate substrate, through the input ends of the signal electrodes on the main substrate connected to the output ends of the signal lines, to the base points on the signal electrodes, become equal.

8. An optical modulator according to claim 1, wherein for the signal electrodes of the respective optical modulation sections on the main substrate, each of output ends connected to the earth electrode via a resistor are arranged side by side on an other side face opposite to one side face of the substrate.

9. An optical modulator according to claim 8, wherein in the signal electrodes of the respective optical modulation sections on the main substrate, the electrical lengths from the input ends to the output ends are the same as each other.

10. An optical modulator according to claim 1, wherein on the intermediate substrate there is provided an earth electrode formed separated from the respective signal lines, and the earth electrode is electrically connected to the earth electrode of the respective optical modulation sections on the main substrate.

11. An optical modulator according to claim 1, wherein a characteristic impedance of the respective signal lines on the intermediate substrate is set to a value between a characteristic impedance of the signal lines of the respective optical modulation sections on the main substrate, and an impedance of an external connector electrically connected to an input end of the respective signal lines.

12. An optical modulator according to claim 1, wherein a center line between the input ends of the respective signal lines on the intermediate substrate corresponding to the respective optical modulation sections is shifted with respect to a center line between the adjacent input ends of the signal electrodes of the respective optical modulation sections on the main substrate.

13. An optical modulator according to claim 1, wherein in the signal electrode of at least one optical modulation section on the main substrate, an input leader line portion in which one end of a portion that runs along the pair of branching wave guides and is extended to one side face of the substrate is made an input end, is bent at an angle with respect to a direction orthogonal to one side face of the main substrate to give an inclined wiring.

14. A light transmitting apparatus including an optical modulator according to claim 1, and a single light source, wherein output light of the light source is input to the optical modulator, and the input light is branched into a plurality of lights and applied to the respective optical modulation sections.

* * * * *